United States Patent [19]

Capozzi

[11] 4,323,968
[45] Apr. 6, 1982

[54] MULTILEVEL STORAGE SYSTEM HAVING UNITARY CONTROL OF DATA TRANSFERS

[75] Inventor: Anthony J. Capozzi, Binghamton, N.Y.

[73] Assignee: International Business Machines Corporation, Armonk, N.Y.

[21] Appl. No.: 169,008

[22] Filed: Jul. 15, 1980

Related U.S. Application Data

[63] Continuation of Ser. No. 955,031, Oct. 26, 1978, abandoned.

[51] Int. Cl.³ .............................................. G06F 13/06
[52] U.S. Cl. .................................................. 364/200
[58] Field of Search ........................................ 364/200

[56] References Cited

U.S. PATENT DOCUMENTS

| | | | |
|---|---|---|---|
| 3,705,388 | 12/1972 | Nishimoto | 364/200 |
| 3,786,427 | 1/1974 | Schmidt et al. | 364/200 |
| 3,806,888 | 4/1974 | Brickman et al. | 364/200 |
| 3,866,183 | 2/1975 | Lange | 364/200 |
| 3,896,419 | 7/1975 | Lange et al. | 364/200 |
| 3,967,247 | 6/1976 | Andersen et al. | 364/200 |
| 4,056,845 | 11/1977 | Churchill, Jr. | 364/200 |
| 4,084,234 | 4/1978 | Calle et al. | 364/200 |
| 4,092,713 | 5/1978 | Scheuneman | 364/200 |

*Primary Examiner*—David H. Malzahn
*Attorney, Agent, or Firm*—E. W. Galbi; J. Jancin, Jr.

[57] ABSTRACT

A two-level storage hierarchy for a data processing system is directly addressable by the main processor. The two-level storage includes a high speed, small cache with a relatively slower, much larger main memory. The processor requests data from the cache and when the requested data is not resident in the cache, it is transferred from the main memory to the cache and then to the processor. The data transfer organization maximizes the system throughput and uses a single integrated control to accomplish data transfers.

1 Claim, 8 Drawing Figures

MULTILEVEL STORAGE SYSTEM HAVING UNITARY CONTROL OF DATA TRANSFERS

This is a continuation of application Ser. No. 955,031, filed Oct. 26, 1978, now abandoned.

BACKGROUND OF THE INVENTION

1. Field of the Invention

This invention relates generally to data processing systems and more particularly to a data processing system having a multilevel memory including at least a first, small, high speed cache memory and one or more large, relatively slower main memories with an integrated control system therefor.

2. Description of the Prior Art

Large data processing systems have processors with substantially increased operating speeds, which has resulted in the need for larger, readily accessible memory systems. In order to fully utilize the increased system operating speeds, it is necessary that the memory or some component thereof, operate at a speed reasonably close to the speed of the processing unit or units. However, it is extremely difficult to reliably randomly access a block of data in a large memory space at high operating speeds in an economical manner.

A solution to the problem is to use a two or more level storage hierarchy including a small, fast cache memory store (hereinafter referred to as a cache) and a large, relatively slower main memory or memories. The system processor unit communicates directly at essentially system speed with the cache. If data requested by the processor unit is not in the cache, it must be found in the main memories and transferred to the cache, where it necessarily replaces an existing block of data.

In order for a cache based system to be effective, there must be a highly efficient control store system to effect data transfer between the main memories and cache and to control any data inputs from the system (channels, processing unit, etc.) to the cache or main memories. If the transfer of data from the main memories is not done efficiently, many of the advantages of using a high speed cache will be lost.

Many of the compromises and trade-offs necessary to optimize a system are not readily apparent. For example, U.S. Pat. No. 3,896,419 describes a cache memory system wherein a data request to the cache store is operated in parallel to the request for data information from the main memory store. A successful retrieval from the cache store aborts the retrieval from the main memory. This would appear to be a very efficient approach, especially where a large number of data requests result in the need to extract data from the main memory. However, with the improved programming techniques which structure systems to require fewer data transfers from the main memory, such an approach can in fact diminish the effective overall operating speed of a system. The reason for this is that even though a successful retrieval from cache aborts the retrieval from main memory, it takes some additional time for the memory to recycle and be ready to handle the next request. Therefore, if a cache "hit" (data in cache) is immediately followed by a cache "miss" (data not in cache) the system performance can be degraded, since the system must wait for the main memory to return to a ready state (to quiesce) before the data acquisition and transfer can begin.

Another disadvantage of such a system is that the various clocks (channel, main memory, cache and processor) must be in sync using the same number of pulse words and the same clock cycles. This, of course, presents design constraints and may result in some inefficiencies in one or more of the subsystems.

OBJECTS AND SUMMARY OF THE INVENTION

Accordingly, it is a principal object of the present invention to provide an improved memory store for a data processing system which overcomes the foregoing disadvantages of the prior art.

Another object of the present invention is to provide a multilevel memory store for a data processing system having a single storage control mechanism.

Yet another object of the present invention is to provide a multilevel memory storage system having improved operating speed and increased reliability.

Yet another and more specific object of the present invention is to provide a centralized control scheme for a multilevel memory store that provides data transfer control to/from a processor/channel and the first and second levels of the storage hierarchy.

The foregoing and other objects and advantages are accomplished according to one aspect of the invention by utilizing a two-level memory system having a single integrated control to accomplish data transfers within the system. The memory includes a relatively small, high speed cache adapted to work with the processor at processor speeds and a relatively large, but slower main memory. In operation the processor requests data from the cache and if the requested data is in the cache (hit), it is transferred via a data bus to the processor. If the requested data is not in the cache (miss), a transfer process takes place to move the requested data from the main memory to the cache, where it can then be re-requested by the processor. The main memory is activated for a data transfer to cache only after it has been determined that a cache miss has occurred.

DESCRIPTION OF THE PREFERRED EMBODIMENT

The foregoing and other objects, features and advantages of the present invention will be apparent from the following more particular description of the preferred embodiments of the invention taken in conjunction with the above-described accompanying drawings.

For illustrative purposes the present invention will be described in the context of a bilevel memory system. However, it will be readily apparent to those skilled in the art that the inventive concept is readily applicable to a multilevel memory system having more than two levels of memory or having parallel memories at one or more levels.

Figure 1:
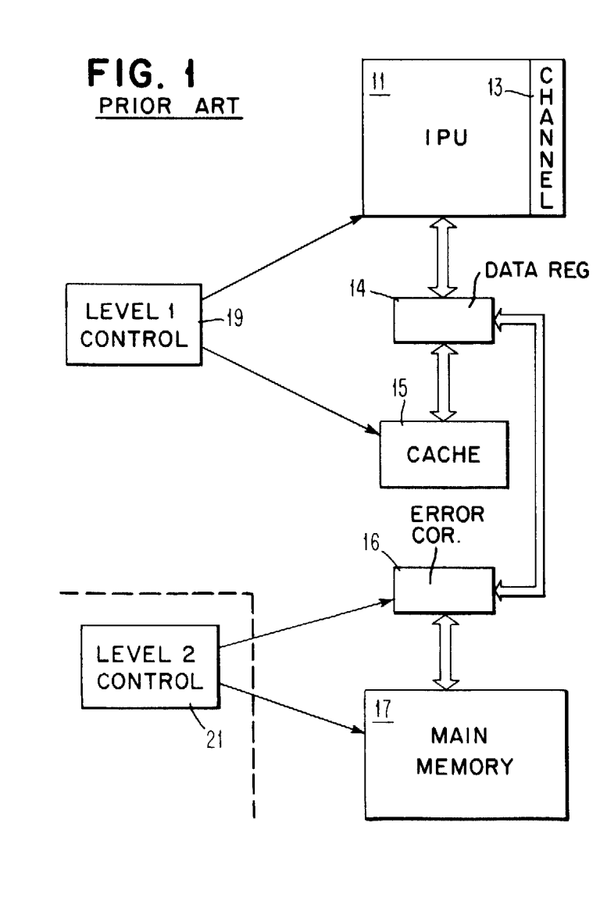
FIG. 1 is a block diagram of a prior art processor system having two levels of control for a bilevel memory store.

Referring first to FIG. 1, there is shown a typical prior art data processing having a two-level memory store. The system includes an information processing unit 11 with the channel hardware 13 included therein. The two-level store consists of a high speed cache 15, an error correction/bit generator 16 and a relatively lower speed main memory 17. The data flow between the IPU 11 and the cache 15 is controlled by a level I control 19, which controls the flow of data from the cache 15 through an input/output register 14 to the IPU 11. If the desired data is not found in cache, the control is transferred to a level II control 21 which will locate the data in the main memory and transfer it via the error correction/bit generator 16 and the input/output data register 14 to the cache 15. In this system configuration, it is necessary that there be an effective "handshake" mode of operation between the level I control 19 and the level II control 21. The level I control would then control the flow of data from the bus into the appropriate cache location. This, in turn, affects the overall operating speed of the system and thereby limits its effectiveness.

Figure 2:
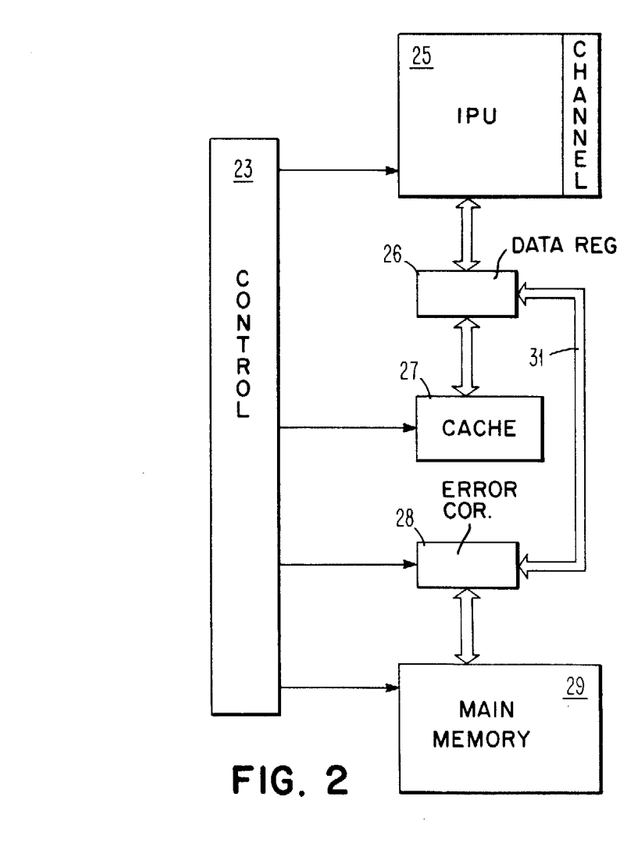
FIG. 2 is a block diagram illustrating a single level of control for a bilevel memory system according to the present invention.

Referring next to FIG. 2, there is shown in block diagram form the concept of a single control 23 for the IPU and channel 25, the input/output register 26, the cache 27, the error correction/bit generator 28 and the main memory 29. By utilizing a single control 23, if the desired data is not found in the cache 27, the main memory 29 can be immediately accessed without a need to first transfer to a different control mechanism all of the necessary data address information. Also, in situations where it is desired to transfer data directly from the processing unit 25 to the main memory 29, by using a single control 23 this can be accomplished by way of a data path 31 which bypasses the cache 27. The specific operational characteristics of such a system will be shown in more detail in the description of the subsequent drawings.

Figure 3:
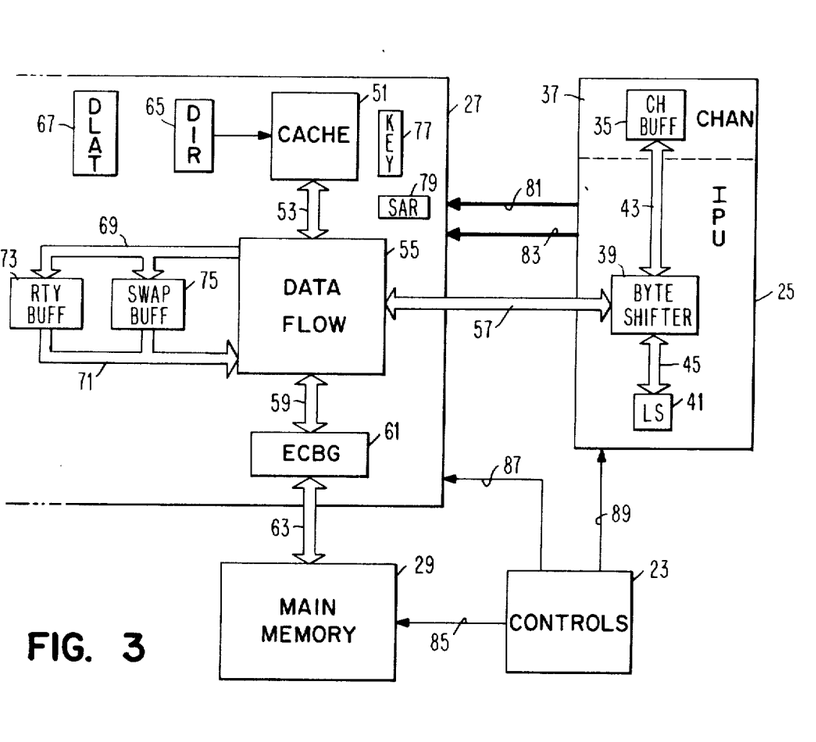
FIG. 3 is a block diagram of a data processor system having a bilevel memory store which illustrates the system data flow.

The block diagram of the system data flow is illustrated in FIG. 3. In this block diagram the essential components involved in the system data flow are illustrated. Referring first to the processor unit 25, the essential elements are the channel buffer 35 in the channel 37, a byte shifter 39 and a local store 41. The channel buffer communicates with the byte shifter via a data line 43 and the byte shifter communicates with the local store via a data line 45. The cache system 27 includes the actual cache store 51 connected via a data line 53 to an input/output data register 55. The data register 55 is connected through a bidirectional data line 57 to the byte shifter 39 in the processor 25. The data flow mechanism communicates via a data line 59 to an error correction/bit generator 61 which in turn connects via a data line 63 to the main memory 29. A directory 65 is connected to the cache store 51 and a directory look-aside table (DLAT) 67 is resident in the cache system 27. Connected to the data register 55 via data lines 69 and 71 are a retry buffer 73 and a swap buffer 75 whose function will be more fully described hereinafter. The cache system 27 also includes a key mechanism 77 and a storage address register (SAR) 79. In addition, there is a unilateral address bus 81 and a unilateral command bus 83 running from the processor 25 to the cache system 27. The controls 23 for these systems are connected via data lines 84, 87 and 89.

Figure 4:
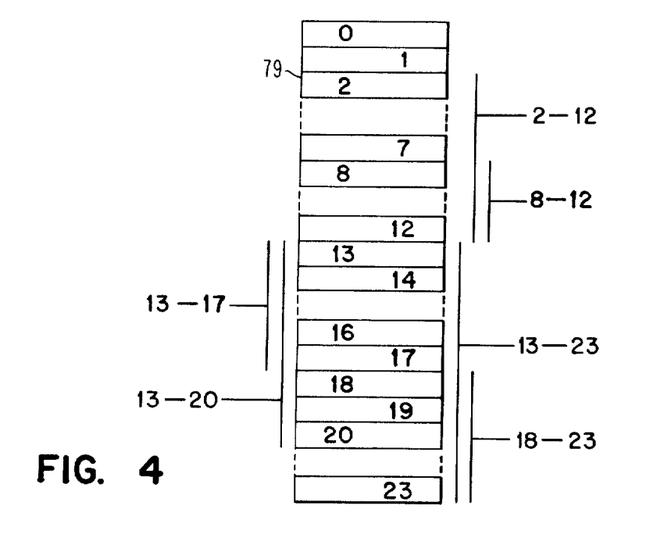
FIG. 4 is a block representation of the address partitioning of a storage address register used in a store controller according to the present invention.

FIG. 4 illustrates a 24 bit storage address register (SAR) 79 which is the main addressing facility of the storage control unit 27 of FIG. 3. The address set into the SAR is gated from the IPU on address bus 81 of FIG. 3 and as illustrated in FIG. 4, various combinations of bits from the SAR are used to address controls in the store controller 27. By way of example, the SAR will be illustrated with bits 2-12 defining the real address of a 2K page in memory, bits 13-17 defining a cache page address, bits 18-20 define an 8-byte line within a cache page and bits 21-23 define a byte within a line. This address partitioning will become more apparent when seen in connection with the description of the store controller of FIG. 5.

Figure 5:
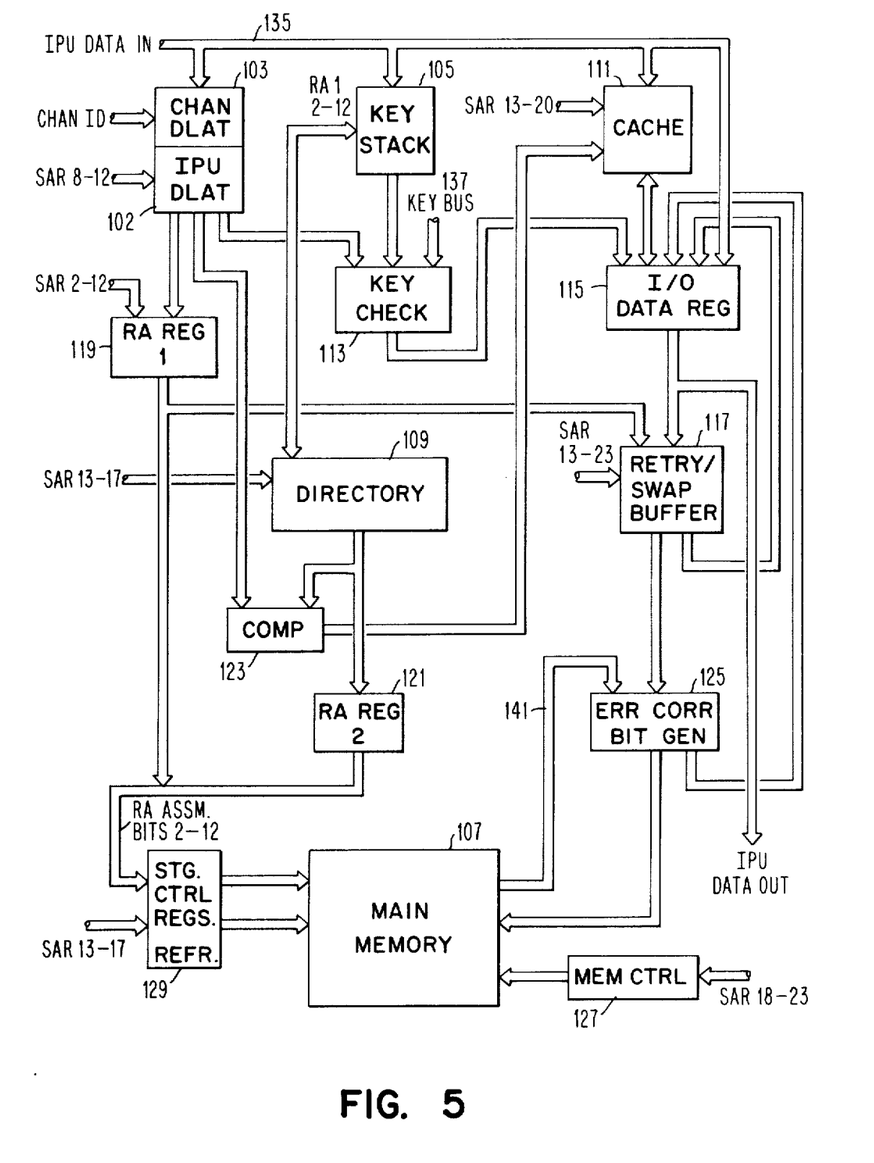
FIG. 5 is a detailed block diagram illustrating the storage control for a data processor system according to the present invention.

In FIG. 5, the various components of the store controller and the relationships to the cache and main memory are illustrated and the storage data flow is indicated. The system includes a processor directory look-aside table (DLAT) 102 and a channel directory look-aside table 103 with the processor DLAT having each entry containing a virtual and real address field, along with a fetch and status bit. The channel DLAT component contains the entries for channel virtual to real addressing capability. The system also includes a key stack 105 with multiple entry components, each entry representing a given page in main store 107. The cache directory 109 contains a plurality of entries with multiple way associativity. For example, the cache directory might be four-way associative and, therefore, the cache 111 would contain four data areas. Each area of the cache 111 contains a plurality of cache pages and the cache is addressed by the storage address register. The system further includes a key check device 113, an input/output data register 115 and a swap buffer 117. There are two components of a real address register assembly 119 and 121, hereinafter referred to as RA1 and RA2. The controller additionally comprises a compare circuit 123 and an error correction/bit generator 125. A main memory controller 127 and storage control registers 129 interface with the main memory.

For purposes of illustration, it will be assumed that the main memory has a 2 meg storage capability, the cache 111 is an 8-byte by 1K facility containing the four data areas, with each area containing 32 cache pages or 256 lines. For such a system, the directory 109 will contain 128 entries with four-way associativity and the key stack is a 1K entry component with each entry representing a 2K page in main storage. The input/output data register 115 will be described as an 8-byte data transfer register, which both receives the processor data on a storage write and sends the data to the processor on a storage read operation. The input/output data register 115 also moves data between components in the storage controller.

The error correction/bit generator 125 provides the correct parity information on the main memory/cache data path. The directory 109 and the directory lookaside tables 102, 103 receive addressing via the storage address register, which, as previously described, is a 24 bit register used to address, via bit grouping, the components of the storage control section. The addresses thereof may be virtual or real. RA1 and RA2 register components 119 and 121 receive addresses from the processor DLAT 102 and the directory 109, respectively, and in conjunction with the SAR, address the main memory 107 via the storage control registers 129.

The cache directory 109 is addressed by storage address register bits 13–17 and specifies a 64-byte cache page. Each entry contains an 11 bit real address and 3 status bits, one bit indicating a valid or invalid status, a modification bit indicating the modify status and a bad entry bit indicating the physical condition of the cache entry. With the four-way associativity, four cache pages, belonging to four different 2K pages, reside concurrently in the cache 111. The source of the real address is the real address fields from the processor DLAT 102 or the storage address register, via RA1 component 119. The cache directory indicates if the desired page is in cache. If the real address is found to be in the directory, and its entry is valid, then the data is in cache. This is defined as a "hit". If the real address is not found in the directory or if its entry is valid, then the data is not in the cache and this is referred to as a data "miss". For a miss, it is necessary to access the main memory to bring the desired data therefrom to the cache.

The cache 111 is an 8K byte facility divided into four sections, defining the four-way associativity with the directory 109. Each section of the cache contains 32 entries of 64 bytes each. The cache receives data from the I/O data register 115 and from the IPU data bus 135. The output from the cache goes to the I/O data register 115. All four data areas of the cache will be addressed simultaneously by the storage address register with the SAR address bit field 13–17 addressing the page component and the SAR bit field 18–20 addressing the 8-byte line component. A final selection is made by the associativity class from the directory 109 that the directory hit occurred on.

In operation, 64-byte pages are loaded into the cache 111 from the main memory 107 only on those commands in which a directory "miss" trap may occur, with the data being transmitted via the I/O data register 115.

The swap buffer 117 stores one cache page at a time and is used to buffer the outgoing page from cache in an outpage operation and stores syndrome bits generated during a fetch from the main memory 107. The syndrome bits are used to identify any corrected data corrected by the error correction/bit generator 125 on any read from storage. A retry buffer (not shown) can be used to store those double words read from cache in a write operation prior to modification in which the cache is modified.

The key stack 105 has a plurality of entries, with each entry representing a 2K page in storage. Each entry contains a plural bit storage protection key, a fetch protection bit and a reference bit and change bit for the identified page. The input for the key stack array is from the I/O data bus. The output from the key stack 105 is checked with the key bus 137 or from the key fields from the processor DLAT 102. The key stack also receives an input from the real address assembly component 119 using bits 2–12 thereof.

The main memory which has a storage capacity typically on the order of megabytes, receives and sends data via the error correction/bit generator 125. The data is selected from the main memory based upon inputs from the memory controller 127, from the real address assembly units 119, 121 and from the storage address register. Data to and from the main memory is transferred 8 bytes at a time on an 8-byte bidirectional data bus connected between the error correction/bit generator and the main memory. In the configuration, according to the present invention, inputs from the channel will always be written directly into the main memory and will invalidate an old cache page having the same address, if it is contained in cache at the time the channel writes to memory. Conversely, the processor will always write into cache, which will then transfer data to the main memory if appropriate. Accordingly, the main memory clock and the channel clock will generally run in sync, for example, using four pulses in a 150 nanosecond cycle time. Also, the cache clock and the processor clock will run together and may be on either a 4, 6 or 8 pulse clock cycle.

As mentioned previously, the input/output data register 115 is an 8-byte register used to move data to and from the processor/channel and the store. The data register also moves data between components in the store controller as illustrated in FIG. 5. The output of the data register may go to the cache input, to the processor data bus, to the swap buffer (or retry buffer) and to the error correction/bit generator. The data register may be set from the cache output, from the processor data bus, from the error correction/bit generator, from the key array, from the retry buffer and from the swap buffer.

The real address assembler is comprised of RA1 119 and RA2 121. RA1 is set from the storage address register or from the real address fields of the directory lookaside tables 102, 103. RA2 is set from the directory 109 real address entry that compares equal. With a DLAT "hit" and a directory "miss", the real address from RA1 is gated to the main memory 107. At the same time, SAR bits 13–17 are also gated to the main memory, with the address bits from RA1 addressing a selected 2K page and with bits 13–17 addressing the selected 64 bytes (cache page). The output of the real address assembly may also be gated to the input to the directory for loading the real address, to the key stack for reading or storing the key, or to the retry/swap buffer array for storing read addresses.

Figure 6:
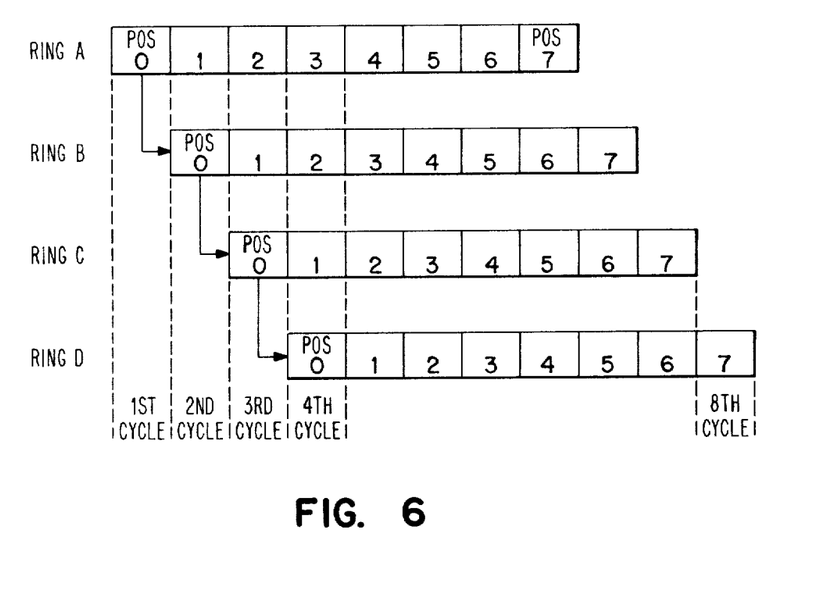
FIG. 6 is a diagram illustrating the sequences of the data transfer according to the present invention.

The manner in which the data transfers within the system take place is illustrated by the control set out in FIG. 6. The basic control mechanism is a bank of ring counters. The number of ring counters used varies depending upon the particular application. For transferring 64-byte cache pages, a three or four ring counter is used. Illustrated in FIG. 6 is a four ring counter with the rings defined as A, B, C and D. The data bus width, as described above, is 8 bytes and, therefore, eight sequential data transfers must take place to transfer one cache page. Each of the 8 bytes transferred is identified with one of the 8 ring positions. That is, each ring position identifies a double word of 8 bytes with position 0 identifying the first double word and position 7 identifying the last double word.

Each of the rings in the bank of ring counters identifies where in the system data flow a given word is on a given cycle. Three of the ring counters are used to transfer data from the main memory of the cache and four are used to transfer data from main memory to a channel of the IPU.

Assume, for example, that 64 bytes of data are to be transferred from the main memory to the channel in the IPU. Then the sequence would occur as follows: for the first cycle, ring A identifies the cycle that each of the 8 bytes appears on the memory bus 63 of FIG. 3; ring B identifies the cycle in which each of the 8 bytes passes through the error correction/bit generator 61; and ring C identifies the cycle in which each of the 8 bytes is stored into in/out data register and thus can be read into the cache. Ring D indicates that the data appears on the bidirectional data bus 57 and is available to the processor or the channel.

If a fetch operation from the main memory 29 to the processor 25 or channel 37 is requested, the sequence is as follows: During the second cycle, position 0 of ring B (FIG. 6) is active, meaning that the double word zero is now passing through the error correction/bit generator and, position 1 of ring A is on, indicating that the main memory data bus now contains double word one. During the third cycle, double word zero is passing through the in/out data register 55 of FIG. 3 corresponding to position 0 of ring C. Double word one is in the error correction/bit generator 61 and double word two appears on the main memory data bus 63. During the fourth cycle, double word zero is present on the bidirectional data bus 57, double word one is passing through the data flow 55, double word two is passing through the error correction/bit generator 61 and double word three is present on the main memory data bus 63. This process continues until the desired amount of data is transferred, for example, through enough cycles for a full 64-byte page.

For transfers between the cache and main memory only three ring counters are needed since the data when resident in the register 55 is immediately available to be read into the cache. The fourth ring counter is needed for transfers between the IPU/channels and main memory since there is an additional cycle required to transfer the data to the 8-byte bidirectional data bus 57 between the PU/channels 25 and the data register 55.

On store operations, the data is transferred in the opposite direction and, therefore, the rings A, B, C and D define data transfer in the reverse order. This is true whether data is being transferred from the channel/processor to the main memory 29 or whether data is being transferred from the cache 51 through the swap buffer to the main memory 29.

Figure 7:
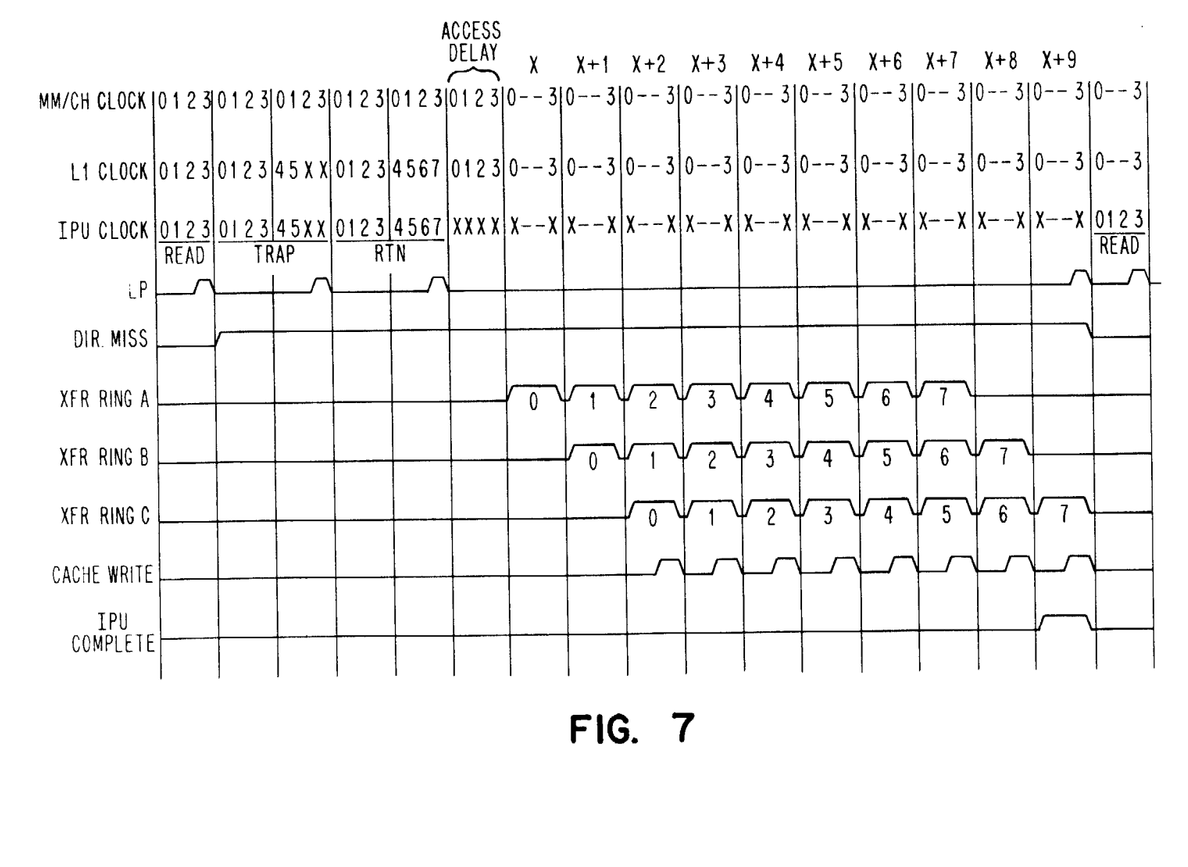
FIG. 7 is a timing diagram showing the sequences involved in a cache "miss" and the subsequent transfer of data from main memory to the cache.
Figure 8:
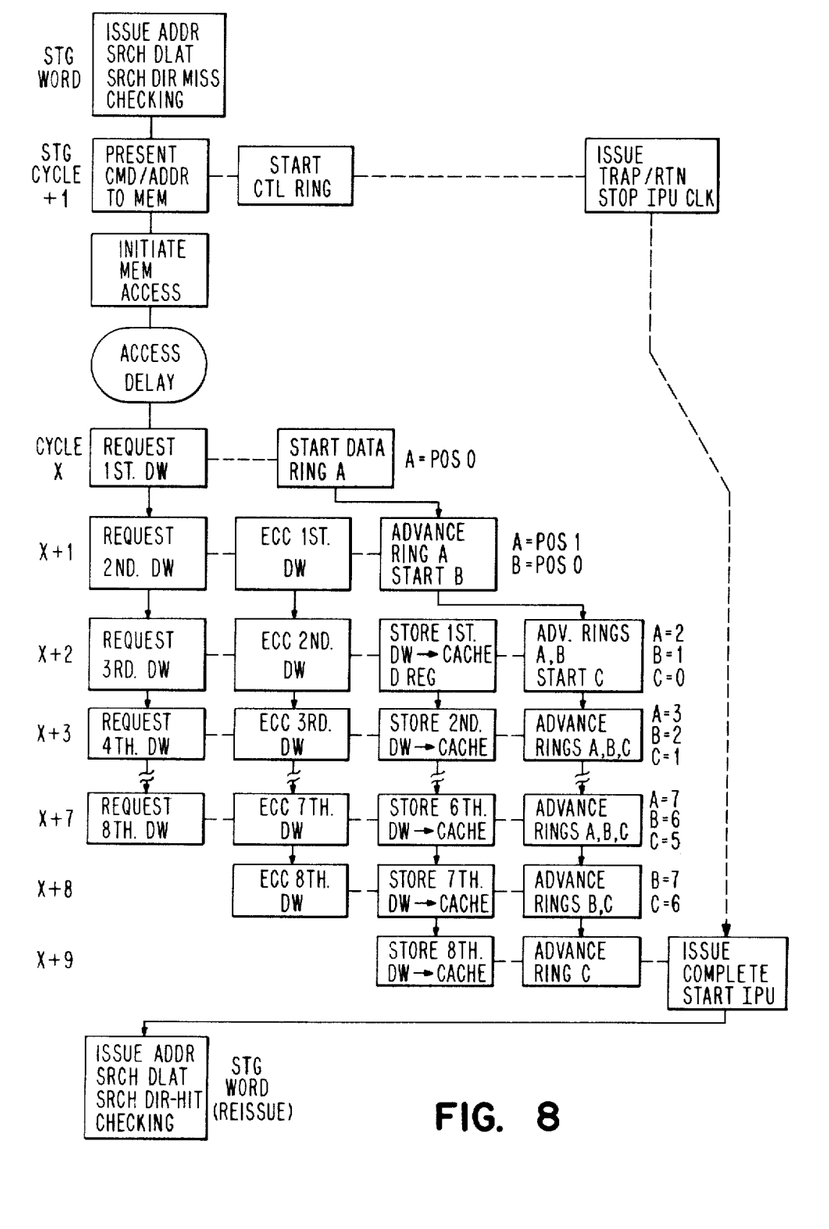
FIG. 8 is a flow chart illustrating the sequence of events as they relate to the timing diagram of FIG. 7.

To better understand the operation of the system, when the processor requests data from the cache and a cache miss occurs, the sequence of events that occurs to transfer data from the main memory to the cache is illustrated in FIG. 8 with the timing sequence shown in the timing chart of FIG. 7. The ring counters are as illustrated in FIG. 6 with the location and time as illustrated in FIG. 5. In the illustration of the flow diagram of FIG. 8, the horizontally positioned boxes are understood to be operating in parallel, whereas the vertically positioned boxes operate sequentially. Prior to the initiation of the transfer of data from the main memory to the cache, the main memory/channel clocks must be brought into synchronization with the cache and IPU clocks. In FIG. 7, this is shown as having already occurred, using any of the synchronization processes well known in the art. In the first step as illustrated in FIG. 8, the storage word issues the address and searches the directory look-aside table. If a search of the directory 109 of FIG. 5 indicates a miss, then the first read cycle of FIG. 7 is followed by a trap sequence on the next two memory/channel cycles and then by a return on the following two cycles. At the initiation of the trap, a directory miss pulse is brought up, so that following the return cycle of the IPU clock, the processor effectively is "put to sleep" as illustrated by the "X's" on the timing line for the IPU clock in FIG. 7. After a check confirms that the miss has in fact occurred, the command and addresses are presented to the main memory 107 and it starts the control ring sequence.

As illustrated, when the control ring counter is initiated, the trap and return cycle commands are also initiated and the IPU clock is stopped. Following the presenting of the command and address to the memory, the memory access is initiated and an indeterminate access delay occurs while locating the data address in the memory. While this is shown as one access delay cycle in FIG. 7, it can actually require more than one cycle. Once the data is located in memory (on cycle X), the first double word is requested and the ring counter A begins counting with the first double word in position 0. On the next cycle, X+1, the second double word is requested, the first double word has moved to the error correction/bit generator 125 (ring counter B) and the ring counters A and B are advanced to indicate now that ring counter A is in position one and B is in position 0.

On the third transfer cycle, X+2, the third double word is requested, the second double word is in the error correction/bit generator 125 and the first double word is in the input/output register 115. At the end of the cycle X+2, the cache write pulse is generated and will read the first double word from the input/output data register 115 to the cache 111. On cycle X+3, the fourth double word is requested from memory, the third double word is in the error correction/bit generator 125, the second double word is in the input/output register 115 and the first double word is resident in the cache 111. At this point, the pipelining effect of the data transfer is full and continues until all data is transferred. Also towards the end of the X+3 cycle, the second double word is read from the input/output data register 115 into the cache 111. This sequence of events continues up through the X+9th cycle at which time the last double word has been stored in the input/output register 115 and read therefrom on a cache write pulse to the cache 111. At the end of the X+9th cycle, the directory miss pulse is dropped. At this time, an IPU complete pulse is generated which turns on the IPU clock and causes the issuing of a read pulse. At this juncture, there will be the issuance from the processor to the cache of the address for the requested data, the directory look-aside table will be searched and a directory hit will occur. After the checking for the accuracy of the directory hit, the data will be transferred on the subsequent cycles from the cache to the processor.

From the foregoing, it is readily apparent that applicant has provided a multilevel memory storage concept for a data processing system having a single storage control mechanism which provides improved operating speed and increased reliability. Using the concept for a two or more level memory system, the centralized control scheme provides data transfer control to/from a processor/channel and the first and subsequent levels of the storage hierarchy in a manner which improves the throughput of the system operation. It will be readily apparent to those skilled in the art that various modifications and changes can be made to the foregoing without departing from the spirit or scope of the invention. Accordingly, it is intended that the invention not be limited to the specifics of the foregoing description of the preferred embodiment, but rather is to embrace the full scope of the appended claims.

Having thus described my invention, what I claim as new, and desire to secure by Letters Patent is:

1. In a data processing system including an information processing unit; a low speed, high capacity main memory; a high speed, low capacity cache for temporarily storing data being used by said information processing unit; at least one input/output channel for transferring information into or out of said information processing unit from devices other than said main memory or said cache; a data transfer and control means comprising:

a storage address register connected to said information processing unit for storing the address of data requested by said information processing unit;

a directory connected to said storage address register for storing addresses of data stored in said cache;

an error correction/bit generator connected to the output of said main memory for detecting memory errors and for generating correction bits;

an input/output data register connected to said information processing unit, said cache and said error correction/bit generator by a plurality of bidirectional data busses for transferring information into or out of said information processing unit from or to said main memory or said cache, means including said directory and said storage address register for interrogating a data request from said information processing unit to determine if it is a hit indicating that said data is in said cache or a miss indicating that said data is not in said cache;

transfer means connected to said main memory, said cache, said error correction/bit generator and said interrogating means, and operative in response to a miss indication from said interrogating means to initiate the transfer of the requested data from said main memory to said cache; and a unitary control connected to said information processing unit, said main memory, said cache and said error correction/bit generator operative to control all data transfers between said information processing unit, said cache and said main memory; said unitary control including said interrogating means, said transfer means, and a means connected to said main memory and said storage address register for maintaining the synchronization of each step in the transfer of data between said main memory and said error correction/bit generator, between said error correction/bit generator and said input/output data register, between said input/output data register and said cache, and between said information processing unit and said input/output data register, whereby said data transfers can take place simultaneously and in step-by-step synchronization.

* * * * *